United States Patent
Gu et al.

(10) Patent No.: US 6,659,910 B2
(45) Date of Patent: Dec. 9, 2003

(54) HYBRID POWER SYSTEM WITH CONTINUOUSLY VARIABLE SPEED

(75) Inventors: Huan-Lung Gu, Hualian (TW); Chin-Taz Wu, Taipei Hsien (TW); Pan-Hsiang Hsieh, Hsinchu Hsien (TW); Wen-Bin Lee, Hsinchu Hsien (TW); Chun-Hsien Lu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 32 days.

(21) Appl. No.: 10/027,551

(22) Filed: Dec. 20, 2001

(65) Prior Publication Data

US 2003/0092529 A1 May 15, 2003

(30) Foreign Application Priority Data

Nov. 14, 2001 (TW) .................................... 90219563 U

(51) Int. Cl.⁷ .............................................. B60K 41/02
(52) U.S. Cl. ................... 477/6; 477/5; 477/8; 477/14; 474/18; 180/65.2; 180/65.4
(58) Field of Search ........................ 475/210; 477/44, 477/39, 77, 80, 5, 6, 8, 14, 16, 15; 180/65.2, 65.4; 474/11, 12, 13, 18

(56) References Cited

U.S. PATENT DOCUMENTS 4,987,967 A * 1/1991 Kouno ...................... 180/233
5,193,634 A * 3/1993 Masut ...................... 180/65.2
5,755,303 A * 5/1998 Yamamoto et al. ........ 180/65.2
5,986,416 A * 11/1999 Dubois ...................... 318/139
6,109,127 A * 8/2000 Liau ........................ 74/336 B

* cited by examiner

Primary Examiner—Tisha D Lewis
(74) Attorney, Agent, or Firm—Pro-Techtor International Services

(57) ABSTRACT

A hybrid power system with continuously variable speed, comprising a first power unit, a secondary shaft, a speed converter, a clutch, a second transmission device, and an electric motor. The first power unit has a primary shaft. The secondary shaft is driven by the primary shaft in a rotational movement. The speed converter is placed between the primary shaft and the secondary shaft, having a transmission belt, transmitting torque from the primary shaft to the secondary shaft. The clutch is set on the primary shaft or on the secondary shaft and has a drum, allowing or interrupting transmission of torque from the first power unit to the secondary shaft. The second transmission device is connected with the drum of the clutch. The electric motor is connected with the secondary shaft, either driving the secondary shaft or being driven by the secondary shaft to generate electricity or running idle.

40 Claims, 3 Drawing Sheets

HYBRID POWER SYSTEM WITH CONTINUOUSLY VARIABLE SPEED

BACKGROUND OF THE INVENTION

1. Field of the Invention

The present invention relates to a hybrid power system with continuously variable speed, particularly to a hybrid power system with continuously variable speed to be used in conjunction with a small internal combustion engine and an electric motor.

2. Description of Related Art

A conventional vehicle is driven by an internal combustion engine. An internal combustion engine generates power that is transmitted to wheels to drive the vehicle. Since internal combustion engines operate by burning fuel, exhaust gas is produced, polluting air. For protecting the environment, electrically driven vehicles have been developed, having no internal combustion engines, but being driven by electric motors powered by batteries. In an electrically driven vehicle, electric energy stored in a battery is converted to mechanical energy by a motor. Mechanical power is by a gear transmitted to wheels. However, batteries have limited energy storage capabilities, so mileage of electrically driven vehicles is insufficient and generally do not meet motorists' demands. Electrically driven vehicles have therefore been sold only in small quantities and are not widely used. For this reason, vehicles driven by hybrid power systems have been developed, each having an engine and an electric motor. By suitable arranging of a transmission device, varying output of power is generated, with torque of the engine and the electric motor adapted appropriately to each other. Thus effective operation is achieved under various conditions, such as climbing, descending, braking and accelerating. An ideal combination of both motors results in efficient operation with high power output and low exhaust gas generation.

Due to a wide variety of transmission devices, hybrid power systems with varying components and varying effects exist. Currently, hybrid power systems are mostly used in four-wheel cars, with hundreds of systems having been developed and large competition between major car manufacturers.

However, small vehicles which are driven by small engines, like light motorcycles and minicars, have little space and need to be inexpensive. So it is difficult to install transmission devices for hybrid power systems of small vehicles. Consequently, very few hybrid power systems are used in small vehicles. Although some research is being done and several related inventions have been made, there is only a narrow range of applications of hybrid power systems small vehicles.

In conventional art, several patents concerning hybrid power systems have been disclosed. Therein, an epicyclic train is taught, where a sun gear and planet gear is driven by an engine and an electric motor. Power output is at a ring gear. Since no torque converter is installed between the engine and the epicyclic train, any change of speed leads to jerks, with the engine and the electric motor not being adapted to each other. When the engine slows down, there is no way to interrupt power transmission. Thus this power transmission device is impractical.

Therefore, a hybrid power system for small vehicles is not only required to be accommodated in a small space, but also to allow for independent operation of the engine and the electric motor, as well as for smooth adaptation thereof to each other. Furthermore, it is desirable to regenerate electric energy by operating the engine and taking advantage of momentum of the moving vehicle. Then a comprehensive effect of the hybrid power system is achieved. At the same time, a direction of development of small power devices, as for motorcycles and minicars, is marked.

SUMMARY OF THE INVENTION

It is the object of the present invention to provide a hybrid power system with continuously variable speed which is inexpensive.

In the present invention, an engine and an electric motor are connected, delivering output on a single shaft, so that various modes of delivering power and driving are feasible. The engine and the electric motor are connected by a speed converter having a V-shaped belt for smooth mutual connection and controlled by controlling devices, so that the following functions are effectively performed:

1. the engine running slowly or stopped, with the electric motor running idle;

2. the engine running slowly or stopped, with the electric motor driving the vehicle forward;

3. the engine running slowly or stopped, with the electric motor driving the vehicle rearward;

4. the engine running, via the speed converter with V-shaped belt driving the vehicle, with the electric motor running idle;

5. the engine running, via the speed converter with V-shaped belt driving the vehicle, with the electric motor generating electricity;

6. the engine running, via the speed converter driving the vehicle, with the electric motor in addition driving the vehicle;

7. the engine slowing down or stopping, with the electric motor generating electricity due to momentum of the vehicle slowing down;

8. the engine running, with the electric motor running idle and an electric generator attached to the engine generating electricity, while the vehicle rests.

The present invention employs a standard engine and a standard electric motor, which are readily available on the market, so cost is saved. By having a second transmission device, an even wider range of engines and electric motors is usable, allowing for flexible adapting to various power standards and a wide range of operating conditions. At the same time, restriction of space is easily accommodated. The present invention is usable in conjunction with two-wheel as well as four-wheel vehicles, ensuring a wide range of applications.

The present invention can be more fully understood by reference to the following description and accompanying drawings.

DETAILED DESCRIPTION OF THE PREFERRED EMBODIMENTS

Figure 1:
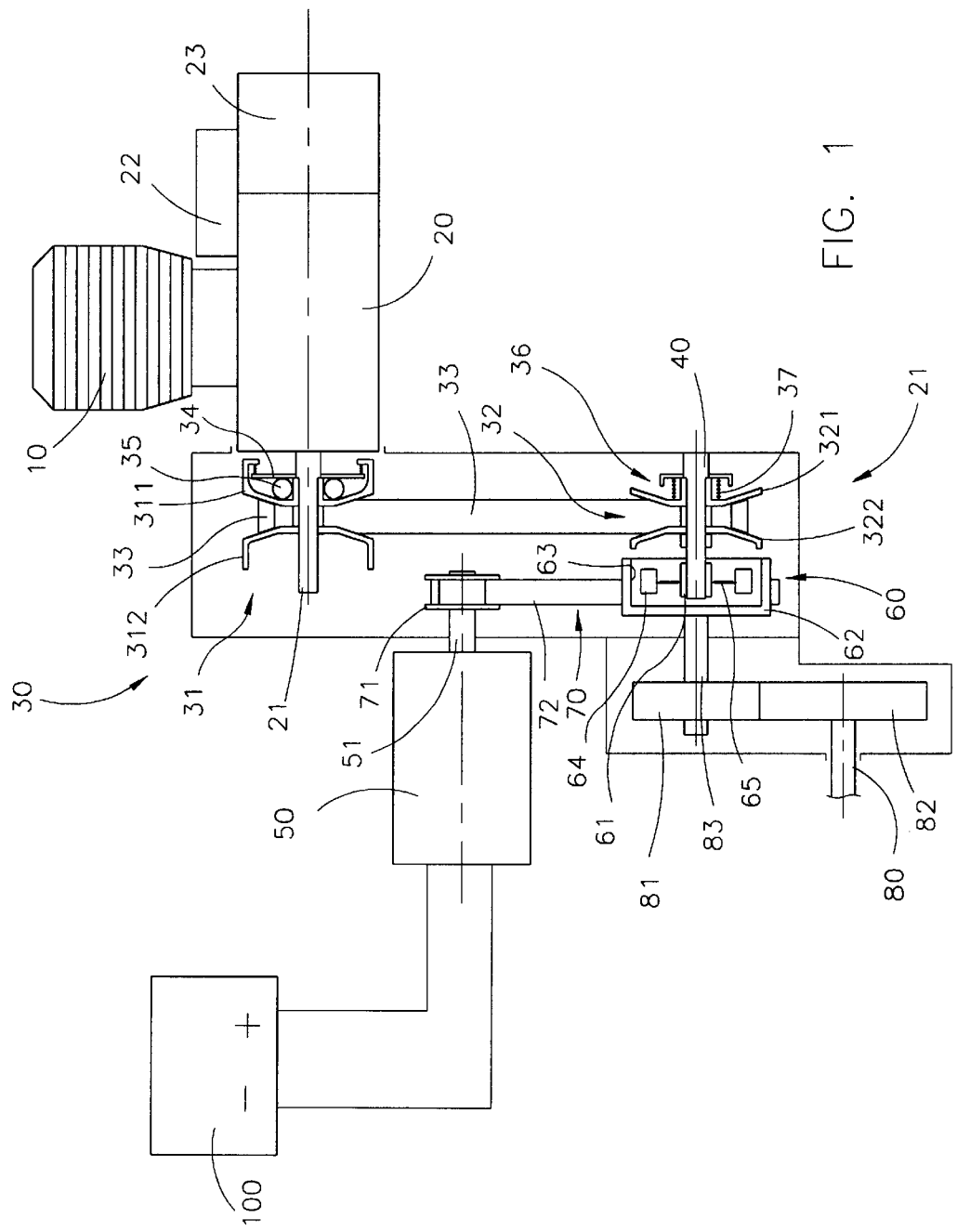
FIG. 1 is a schematic illustration of the hybrid power system with continuously variable speed of the present invention in the first embodiment, to be used in conjunction with a two-wheel vehicle.

As shown in FIG. 1, the hybrid power system with continuously variable speed of the present invention in a first embodiment mainly comprises: a first power unit 10; a transmission box 20; a speed converter 30 with a V-shaped belt; a secondary shaft 40; and an electric motor 50. The first power unit 10 via the transmission box 20 drives a primary shaft 21. The primary shaft 21 drives the speed converter 30, which in turn drives a rotational movement of the secondary shaft 40. From here, power is transmitted via a clutch 60 and two gear wheels 81, 82 for reducing speed to wheels of a vehicle.

Any power-generating device is employable as the first power unit 10, being depicted in the Figs. as an internal combustion engine. The transmission box 20 is a crankshaft system. A starter 22 and an electric generator 23 are attached to the transmission box 20. The starter 22 is operated manually or electrically for starting the first power unit 10. The electric generator 23 is driven by the first power unit 10, generating a small quantity of electricity for recharging and providing timing signals of the rotating movement of the first power unit 10 as well as speed control signals.

The speed converter 30 with a V-shaped belt comprises: a primary wheel 31, put on the primary shaft 21; a secondary wheel 32, put on the secondary shaft 40; and a V-shaped transmission belt 33 between the primary and secondary wheels 31, 32 for having the primary wheel 31 drive the secondary wheel 32. The primary wheel 31 is composed of two cone-shaped wheel plates 311, 312, with a gap left in between. The wheel plate 311 is glidingly movable on the primary shaft 21 in an axial direction. A blocking plate 34 is set on the primary shaft 21, facing an outer side of the wheel plate 311. Several grooves on the outer side of the wheel plate 311 accommodate several balls 35, which are located between the outer side of the wheel plate 311 and the blocking plate 34. When the primary wheel 31 rotates, the balls 35 are by a centrifugal force radially driven away from the primary shaft 21. Then the balls 35 are blocked by the blocking plate 34 while still being exposed to the centrifugal force. A resulting counterforce pushes the wheel plate 311 axially, changing the width of the gap between the wheel plates 311, 312.

The secondary wheel 32 is composed of two cone-shaped wheel plates 321, 322, with a gap left in between. The wheel plate 321 is movable on the secondary shaft 40 in an axial direction. A torque cam 36 and a spring 37 are inserted between the wheel plate 321 and the secondary shaft 40. Thus the wheel plate 321, when exposed to a changed torque, axially moves along the secondary shaft 40, changing the width of the gap between the wheel plates 321, 322.

The balls 35 and the torque cam 36 cause the wheel plates 311, 312 of the primary wheel 31 and the wheel plates 321, 322 of the secondary wheel 32 to move together or apart according to the rotational speed of the first power unit 10 and torque load. The V-shaped transmission belt 33 has a cross-section with an inclined surface that corresponds to inclinations of the wheel plates 311,312 and 321, 322. Changing the widths of the gaps between the wheel plates 311, 312 and 321, 322 changes diameters of circumference of the V-shaped transmission belt 33 on the primary and secondary wheels 31, 32, respectively. Thus rotational speed is geared down in the speed converter by continuous ratios, adapting the rotational speed of the first power unit 10 to torque load.

Furthermore, the speed converter 30 has a clutch 60. The clutch 60 is placed between the secondary shaft 40 and the secondary wheel 32. The clutch 60 comprises: a seat 61, fixed on the secondary shaft 40; a drum 62, surrounding the seat 61 and having a peripheral inner side that is covered with a frictional coating 63; several gripping blocks 64 on the seat 61; and several springs 65 between the seat 61 and the gripping blocks 64. The several gripping blocks 64 are pulled toward the seat 61 by the springs 65. When the secondary shaft 40 rotates, the gripping blocks 64 are pushed radially outward by a centrifugal force. When rotational speed has reached a clutching threshold the centrifugal force overcomes the elastic force of the springs 65, and the gripping blocks move outward, finally pressing on the frictional coating 63. Then the seat 61 and the drum 62 are connected, so that torque is transmitted from the secondary shaft 40 to the drum 62. When, on the other hand, the engine runs idle, with the secondary shaft 40 rotating at a rotational speed below the clutching threshold, the centrifugal force on the gripping blocks 64 is smaller than the elastic force exerted by the springs 65, so that the gripping blocks 64 stay away from the frictional coating 63, and torque is transmitted from the secondary shaft 40 to the drum 62.

The drum 62 is connected to wheels of the vehicle by a driven shaft 80, which is driven by the gear wheels 81, 82. The gear wheels 81, 82 increase torque. The gear wheel 81 sits on an axis 83 which is connected with the drum 62.

The main characteristic of the present invention is the electric motor 50. The electric motor 50 is connected to a rechargeable battery 100, supplying the electric motor 50. The electric motor 50 drives the drum 62 via a second transmission device 70. Thus the drum 62 is driven by the first power unit 10 or by the electric motor 50, so that a dual power system is formed.

The second transmission device 70 has a second primary wheel 71 and a second transmission belt 72. The second primary wheel 71 is set on a driving axis 51 of the electric motor 50. The second transmission belt 72 runs over the second primary wheel 71 and an outer peripheral side of the drum 62, with teeth engaging at contact surfaces, so that there will be no slipping of the second transmission belt 72.

Figure 2:
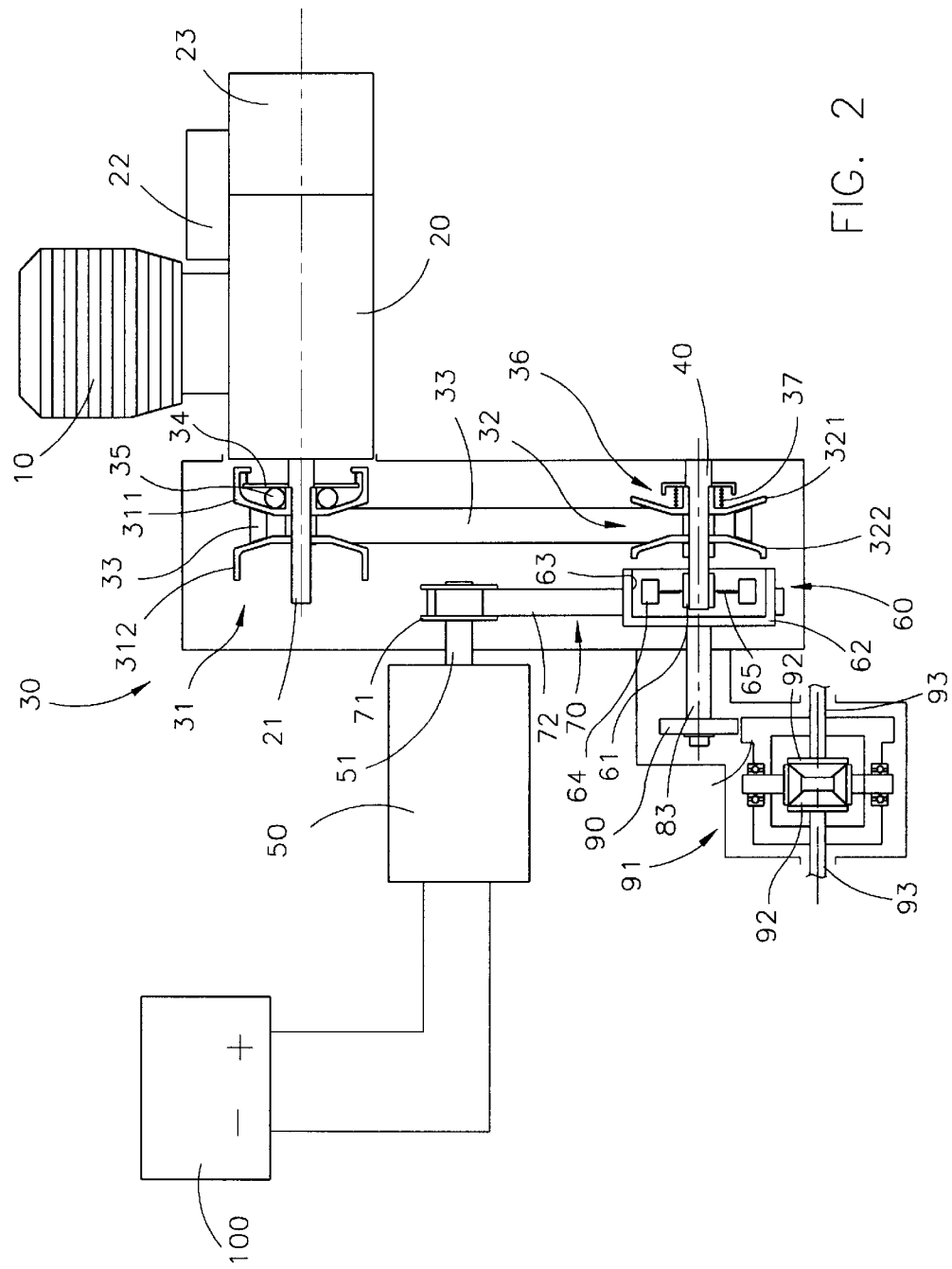
FIG. 2 is a schematic illustration of the hybrid power system with continuously variable speed of the present invention in the second embodiment, to be used in conjunction with a four-wheel vehicle.

Referring to FIG. 2, in a second embodiment of the present invention, used in conjunction with a four-wheel vehicle, a gear wheel 90 for reducing rotational speed is connected with the drum 62 of the clutch 60. The gear wheel 90 drives a differential gear 91 with two bevel wheels 92 and two driven shafts 93, which are connected to left and right wheels of the vehicle. Thus the vehicle is driven by the differential gear 91, the bevel wheels 92 and the driven shafts 93.

Figure 3:
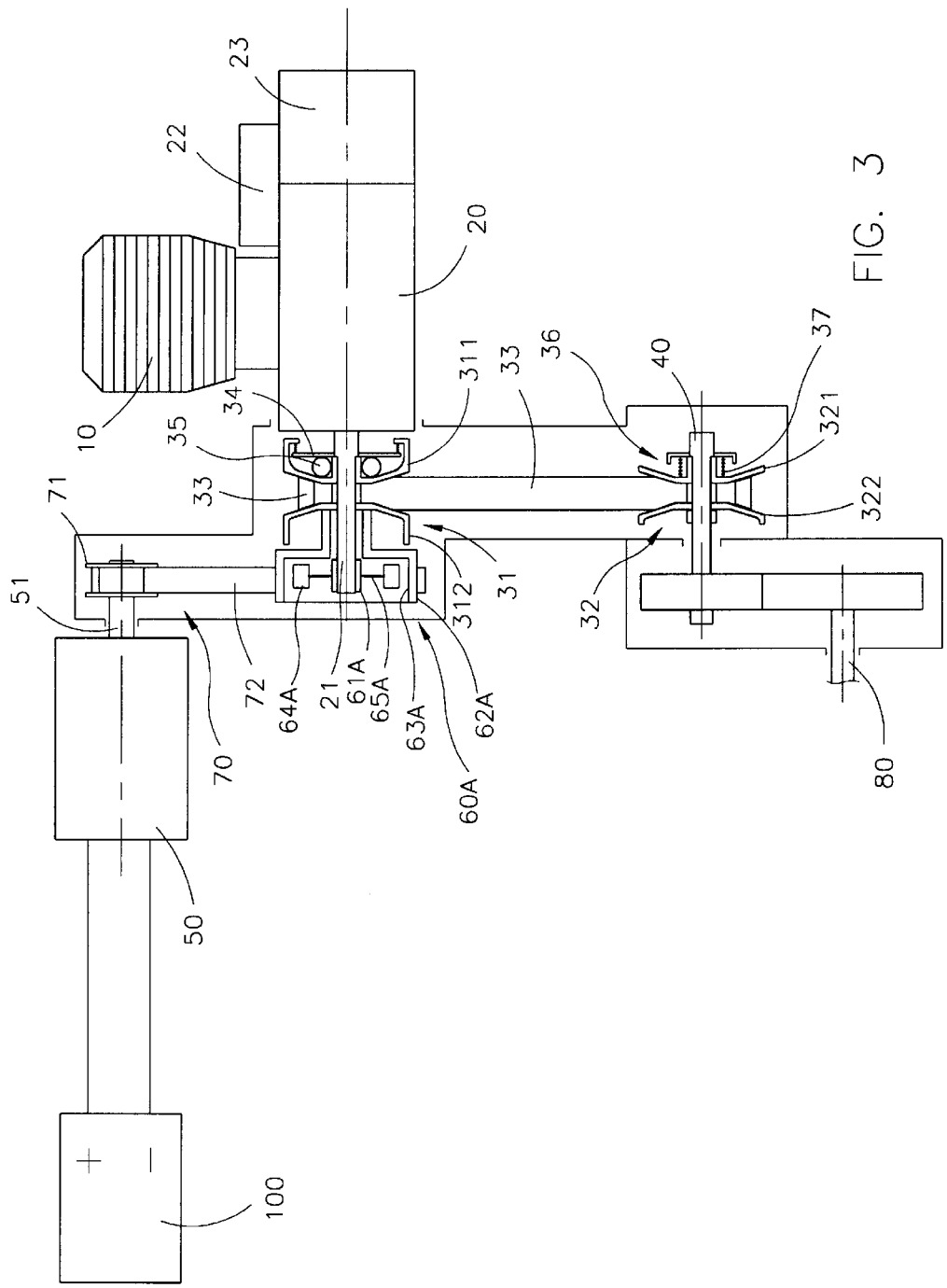
FIG. 3 is a schematic illustration of the hybrid power system with continuously variable speed of the present invention in the third embodiment, to be used in conjunction with a two-wheel vehicle.

Referring to FIG. 3, the present invention in a third embodiment has a clutch 60A, placed between the primary shaft 21 and the primary wheel 31. The clutch 60A comprises: a seat 61A, fixed on the primary shaft 21; a drum 62A, surrounding the seat 61A, having a peripheral inner side that is covered with a frictional coating 63A and having a peripheral outer side with a plurality of teeth; several gripping blocks 64A on the seat 61A; and several springs 65A between the seat 61A and the gripping blocks 64A. The teeth of the drum 62A are engaged with teeth on the second transmission belt 72, thus being taken along by a rotational movement of the electric motor 50. The springs 65A determine a clutching threshold, a rotational speed of the primary shaft 21 at which the gripping blocks 64A hit the frictional coating 63A on the drum 62A, so that the primary shaft 21 takes along the drum 62A. The drum 62A is linked with the primary wheel 31. Thus torque is transmitted by the speed converter 30 from the first power unit 10 to the secondary shaft 40. In the third embodiment of the present invention, the clutch 60A is placed at a location different from the clutch 60 of the previous embodiments. The effect thereof, however, is the same.

By employing the speed converter 30 and having the drum 62 of the clutch 60 taken along by the second transmission device 70, the present invention ensures that the first power unit 10 and the electric motor 50 are smoothly adapted to each other. The speed converter 30 converts torque as needed and the clutch 60 allows to control transmission, so that torque passes smoothly between the first power unit 10 and the electric motor 50. Furthermore, torque from the electric motor 50 is increased by the second transmission device 70, so a relatively small motor is usable with the same effect.

When the vehicle is started or driven in reverse, the first power unit 10 runs idle or is turned off. Torque generated by the electric motor 50 alone is relatively small. The electric motor 50 drives the drum 62 directly in forward or reverse direction, driving the vehicle forward or rearward. For cruising at high speed, the first power unit 10 is started by the starter 22, speeding up the vehicle. Since the first power unit 10 and the electric motor 50 are smoothly adapted to each other by the speed converter 30 and the clutch 60, no rapid changes of torque will occur.

When stored electricity is insufficient or the vehicle is driven by the first power unit alone, a control circuit switches the electric motor 50 to operate as electricity generator. Then a rotor of the electric motor 50 is turned by the drum 62 of the clutch 60, generating electricity and recharging the battery 100. Furthermore, while braking, the electric motor 50 is preferably switched to operate as electricity generator, so that kinetic energy of the vehicle is converted to electric energy of the battery 100 and, at the same time, braking is more effective.

While the invention has been described with reference to preferred embodiments thereof, it is to be understood that modifications or variations may be easily made without departing from the spirit of this invention which is defined by the appended claims.

What is claimed is:

1. A hybrid power system with continuously variable speed, comprising:
   a first power unit having a primary shaft;
   a secondary shaft driven to rotate by said primary shaft;
   a speed converter placed between said primary shaft and said secondary shaft, said speed converter has a transmission belt that transmits torque from said primary shaft to said secondary shaft;
   a clutch set on said primary shaft or on said secondary shaft, said clutch has a drum and controls transmission of torque from said first power unit to said secondary shaft;
   a second transmission device connected to said drum of said clutch; and
   an electric motor connected to said second transmission device, said electric motor either drives said secondary shaft via said second transmission device or is driven by said secondary shaft to generate electricity or is in an idle state; wherein
   said first power unit is an internal combustion engine to which a starter for starting said first power unit and an electric generator are attached, said electric generator is driven by said first power unit to generate electricity as well as timing and speed signals of a rotating movement of said first power unit.

2. A hybrid power system according to claim 1, wherein said second transmission device comprises a seat, at least one gripping block, and at least one spring.

3. A hybrid power system according to claim 1, wherein said second transmission device comprises a second primary wheel and a second transmission belt running over said second primary wheel and said drum of said clutch.

4. A hybrid power system according to claim 1, wherein said electric motor is connected to a rechargeable battery as an energy source to drive said secondary shaft.

5. A hybrid power system according to claim 1, wherein said secondary shaft is either driven by said speed converter alone or by said electric motor alone or by said speed convertor and said electric motor combined.

6. A hybrid power system according to claim 1, wherein said drum of said clutch is connected to an axis of a gear wheel for reducing rotational speed.

7. A hybrid power system according to claim 1, wherein said drum of said clutch drives a driven shaft via a gear.

8. A hybrid power system according to claim 1, wherein said drum of said clutch is connected to a gear wheel to reduce rotational speed.

9. A hybrid power system according to claim 8, wherein said gear wheel drives a differential gear with two bevel wheels and two driven shafts which are connected to left and right wheels of a vehicle, respectively.

10. A hybrid power system according to claim 1, wherein said clutch is set on said primary shaft and is connected to a primary wheel.

11. A hybrid power system with continuously variable speed, comprising:
    a first power unit having a primary shaft;
    a secondary shaft driven to rotate by said primary shaft;
    a speed converter placed between said primary shaft and said secondary shaft, said speed converter has a transmission belt that transmits torque from said primary shaft to said secondary shaft;
    a clutch set on said primary shaft or on said secondary shaft, said clutch has a drum and controls transmission of torque from said first power unit to said secondary shaft;
    a second transmission device connected to said drum of said clutch; and
    an electric motor connected to said second transmission device, said electric motor either drives said secondary shaft via said second transmission device or is driven by said secondary shaft to generate electricity or is in an idle state; wherein
    said second transmission device comprises a seat, at least one gripping block, and at least one spring.

12. A hybrid power system according to claim 11, wherein said first power unit is an internal combustion engine to which a starter for starting said first power unit and an electric generator are attached, said electric generator is driven by said first power unit to generate electricity as well as timing and speed signals of a rotating movement of said first power unit.

13. A hybrid power system according to claim 11, wherein said second transmission device comprises a second primary wheel and a second transmission belt running over said second primary wheel and said drum of said clutch.

14. A hybrid power system according to claim 11, wherein said electric motor is connected to a rechargeable battery as an energy source to drive said secondary shaft.

15. A hybrid power system according to claim 14, wherein said secondary shaft is either driven by said speed converter alone or by said electric motor alone or by said speed converter and said electric motor combined.

16. A hybrid power system according to claim 11, wherein said drum of said clutch is connected to an axis of a gear wheel for reducing rotational speed.

17. A hybrid power system according to claim 11, wherein said drum of said clutch drives a driven shaft via a gear.

18. A hybrid power system according to claim 11, wherein said drum of said clutch is connected to a gear wheel to reduce rotational speed.

19. A hybrid power system according to claim 18, wherein said gear wheel drives a differential gear with two bevel wheels and two driven shafts which are connected to left and right wheels of a vehicle, respectively.

20. A hybrid power system according to claim 10, wherein said clutch is set on said primary shaft and is connected to a primary wheel.

21. A hybrid power system with continuously variable speed, comprising:
   a first power unit having a primary shaft;
   a secondary shaft driven to rotate by said primary shaft;
   a speed converter placed between said primary shaft and said secondary shaft, said speed converter has a transmission belt that transmits torque from said primary shaft to said secondary shaft;
   a clutch set on said primary shaft or on said secondary shaft, said clutch has a drum and controls transmission of torque from said first power unit to said secondary shaft;
   a second transmission device connected to said drum of said clutch; and
   an electric motor connected to said second transmission device, said electric motor either drives said secondary shaft via said second transmission device or is driven by said secondary shaft to generate electricity or is in an idle state; wherein
   said second transmission device comprises a second primary wheel and a second transmission belt running over said second primary wheel and said drum of said clutch.

22. A hybrid power system according to claim 21, wherein said second transmission device comprises a seat, at least one gripping block, and at least one spring.

23. A hybrid power system according to claim 21, wherein said first power unit is an internal combustion engine to which a starter for starting said first power unit and an electric generator are attached, said electric generator is driven by said first power unit to generate electricity as well as timing and speed signals of a rotating movement of said first power unit.

24. A hybrid power system according to claim 21, wherein said electric motor is connected to a rechargeable battery as an energy source to drive said secondary shaft.

25. A hybrid power system according to claim 21, wherein said secondary shaft is either driven by said speed converter alone or by said electric motor alone or by said speed conveter and said electric motor combined.

26. A hybrid power system according to claim 21, wherein said drum of said clutch is connected to an axis of a gear wheel for reducing rotational speed.

27. A hybrid power system according to claim 21, wherein said drum of said clutch drives a driven shaft via a gear.

28. A hybrid power system according to claim 21, wherein said drum of said clutch is connected to a gear wheel to reduce rotational speed.

29. A hybrid power system according to claim 28, wherein said gear wheel drives a differential gear with two bevel wheels and two driven shafts which are connected to left and right wheels of a vehicle, respectively.

30. A hybrid power system according to claim 21, wherein said clutch is set on said primary shaft and is connected to a primary wheel.

31. A hybrid power system with continuously variable speed, comprising:
   a first power unit having a primary shaft;
   a secondary shaft driven to rotate by said primary shaft;
   a speed converter placed between said primary shaft and said secondary shaft, said speed converter has a transmission belt that transmits torque from said primary shaft to said secondary shaft;
   a clutch that has a drum and controls transmission of torque from said first power unit to said secondary shaft;
   a second transmission device connected to said drum of said clutch; and
   an electric motor connected to said second transmission device, said electric motor either drives said secondary shaft via said second transmission device or is driven by said secondary shaft to generate electricity or is in an idle state; wherein
   said clutch is set on said primary shaft and is connected to a primary wheel.

32. A hybrid power system according to claim 31, wherein said second transmission device comprises a seat, at least one gripping block, and at least one spring.

33. A hybrid power system according to claim 31, wherein said second transmission device comprises a second primary wheel and a second transmission belt running over said second primary wheel and said drum of said clutch.

34. A hybrid power system according to claim 31, wherein said electric motor is connected to a rechargeable battery as an energy source to drive said secondary shaft.

35. A hybrid power system according to claim 31, wherein said secondary shaft is either driven by said speed convertor alone or by said electric motor alone or by said speed convertor and said electric motor combined.

36. A hybrid power system according to claim 31, wherein said drum of said clutch is connected to an axis of a gear wheel for reducing rotational speed.

37. A hybrid power system according to claim 31, wherein said drum of said clutch drives a driven shaft via a gear.

38. A hybrid power system according to claim 31, wherein said drum of said clutch is connected to a gear wheel to reduce rotational speed.

39. A hybrid power system according to claim 38, wherein said gear wheel drives a differential gear with two bevel wheels and two driven shafts which are connected to left and right wheels of a vehicle, respectively.

40. A hybrid power system according to claim 31, wherein said first power unit is an internal combustion engine to which a starter for starting said first power unit and an electric generator are attached, said electric generator is driven by said first power unit to generate electricity as well as timing and speed signals of a rotating movement of said first power unit.

* * * * *